United States Patent
Koenen

(10) Patent No.: US 7,143,412 B2
(45) Date of Patent: Nov. 28, 2006

(54) METHOD AND APPARATUS FOR OPTIMIZING PERFORMANCE IN A MULTI-PROCESSING SYSTEM

(75) Inventor: David J. Koenen, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 729 days.

(21) Appl. No.: 10/202,788

(22) Filed: Jul. 25, 2002

(65) Prior Publication Data

US 2004/0019891 A1    Jan. 29, 2004

(51) Int. Cl.
*G06F 9/00*    (2006.01)

(52) U.S. Cl. ............ 718/102; 718/103; 718/106; 719/318

(58) Field of Classification Search ............ 718/102, 718/106, 103; 711/3; 719/318
See application file for complete search history.

(56) References Cited

U.S. PATENT DOCUMENTS

| | | | |
|---|---|---|---|
| 5,886,872 A | 3/1999 | Koenen et al. | 361/719 |
| 5,946,189 A | 8/1999 | Koenen et al. | 361/698 |
| 6,260,127 B1 | 7/2001 | Olarig et al. | 711/167 |
| 6,304,945 B1 | 10/2001 | Koenen | 711/141 |
| 6,349,035 B1 | 2/2002 | Koenen | 361/700 |
| 6,785,793 B1* | 8/2004 | Aboulenein et al. | 711/167 |
| 2002/0087652 A1* | 7/2002 | Davis et al. | 709/213 |
| 2003/0229770 A1* | 12/2003 | Jeddeloh | 711/213 |
| 2005/0060462 A1* | 3/2005 | Ota | 710/260 |

* cited by examiner

Primary Examiner—William Thomson
Assistant Examiner—Andy Ho

(57) ABSTRACT

A technique for improving performance in a multi-processor system by reducing access latency by correlating processor, node and memory allocation. Specifically, a Process/Thread Scheduler is modified such that system mapping and node proximity tables may be referenced to help determine processor assignments for ready-to-run processes/threads. Processors are chosen to minimize access latency. Further, the Page Fault Handler is modified such that free memory pages are assigned to a process based partially on the proximity of the memory with respect to the processor requesting memory allocation.

18 Claims, 3 Drawing Sheets

METHOD AND APPARATUS FOR OPTIMIZING PERFORMANCE IN A MULTI-PROCESSING SYSTEM

BACKGROUND OF THE INVENTION

1. Field Of The Invention

This invention relates generally to improved performance in a multi-processing system and, more particularly, to techniques for reducing access latency by correlating memory allocations with requesting processor location in a multi-processing system.

2. Background Of The Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Computer usage has increased dramatically over the past few decades. With the advent of standardized architectures and operating systems, computers have become virtually indispensable for a wide variety of uses from business applications to home computing. Whether a computer system includes a single personal computer or a network of computers, computers today rely on processors, associated chip sets, and memory chips to perform most of the processing of requests throughout the system. The more complex the system architecture, the more difficult it becomes to manage and process the requests efficiently.

Some systems, for example, include multiple processing units or microprocessors connected together via a processor bus. To coordinate the exchange of information among the processors, a cache coherency protocol is generally provided. The cache coherency protocol is further tasked with coordinating the exchange of information between the plurality of processors and the system memory. Cache memory is a special high speed storage mechanism which may be provided as a reserved section of the main memory or as an independent high-speed storage device. Essentially, the cache memory is a portion of the RAM which is made of high speed static RAM (SRAM) rather than the slower and cheaper dynamic RAM (DRAM) which may be used for the remainder of the main memory. When a program needs to access new data, the operating system first checks to see if the data is stored in the main memory before going out to retrieve it from disk. The processor may store a portion of that memory in its cache SRAM. By storing frequently accessed data and instructions in the SRAM, the system can minimize its access to the slower DRAM and thereby increase the request processing speed in the system and improve overall system performance.

Each computer generally includes an operating system (O/S), such as DOS, OS/2, UNIX, Windows, etc., to run program applications and perform basic functions, such as recognizing input from the keyboard, sending output to the display screen, keeping track of files and directories stored in memory, and controlling peripheral devices such as disk drives and printers. Operating systems provide a software platform on top of which application programs can run. For large systems, the O/S may allow multiprocessing (running a program on more than one processor), multitasking (allowing more than one program to run with time division scheduling), and multithreading (allowing different parts of a single program to run concurrently on one or more processors). When a computer system is powered-up, the O/S generally loads into main memory. The O/S includes a kernel which is the central module in the operating system. The kernel is the first part of the O/S to load into the main memory, and it remains in main memory while the system is operational. Typically, the kernel is responsible for memory management, process and task scheduling, and disk management. In most systems, the kernel schedules the execution of program segments, or "threads," for one or more applications.

Regardless of whether the system is a single computer or a network of computers (wherein each individual computer represents a "node" in the system), multiprocessing design schemes are generally implemented for advanced computer systems. Some systems share a single common bus and single memory controller. Others can have one or more memory controllers on a shared bus, while still others can have multiple buses to a single memory controller. As the number of CPUs gets larger, having a single resource like a bus or memory controller becomes a bottleneck to the system performance as well as creating a volumetric problem fitting too many devices near a common resource. A common solution to this problem is to divide the CPUs into small clusters and connect them to each other via some interconnect fabric. Likewise, the system memory can also be divided, distributed and connected via some interconnect fabric, as well. This "distributed memory system," can be implemented through a variety of schemes such as uniform memory access (UMA) or non-uniform memory access (NUMA) as discussed further below.

For a NUMA distributed memory systems, all processors in the system are able to access any memory space in the entire system regardless of proximity to the requesting processor. Each processor makes requests to the memory node containing the specified memory, wherein a caching scheme may be implemented to improve system performance. Regardless of the caching scheme, the distributed system should ensure that all copies of a memory block contain the most recent and correct data. Thus, as soon as a processor writes new data to a cached line, all other cached lines must be invalidated or updated. The method employed to accomplish this is generally referred to as "cache coherency."

There are two basic categories of cache coherency schemes: "write invalidate," which invalidates all old cached copies of a changed line, and "write update," which updates all old cached copies of a changed line. Both cache coherency schemes require sending messages over the memory network to inform the caches of the change. Rather than broadcasting each change to every processor in the system, a shared list is usually provided to track all changes at each corresponding node. Directory-based cache coherency maintains a section of memory which contains memory block sharing information. Snoop-based cache coherency maintains a list with each cached line which denotes which processors are sharing that particular line. Although snooping protocols require more cache memory, the shared list is immediately available without having to perform a directory lookup as required in directory-based protocols.

Current distributed memory architectures, such as COMA (cache-only memory architecture) and cc-NUMA (cache coherent NUMA), are generally used in large multi-processor systems wherein the main memories are distributed among the various processing nodes which make up the overall system. cc-NUMA may use a local cache at each node to hold copies of both local data and/or data from other memory nodes. Disadvantageously, moving data from a remote node to a local cache increases access latency. Thus, implementing remote cache architectures, such as cc-NUMA, tends to slow down system performance and increase interconnect utilization. The farther, or more "remote," the memory segment used in conjunction with a particular processor, the higher the access latency and the lower the system performance.

The COMA architecture tries to alleviate some of the overhead involved in the cc-NUMA systems. In a COMA system, additional hardware, including tag and state memory, is added to the DRAM of each processing node to convert it into a kind of cache. This additional hardware enables the disassociation of the actual data location in the machine and the physical address produced by the processors. This enables data to be replicated and migrated automatically upon demand around the system. While this architecture may provide a more flexible platform for applications, it requires complex hardware and data coherence protocols. Thus, the COMA approach generally requires the addition of expensive hardware to handle page migration.

The present invention may address one or more of the problems set forth above.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
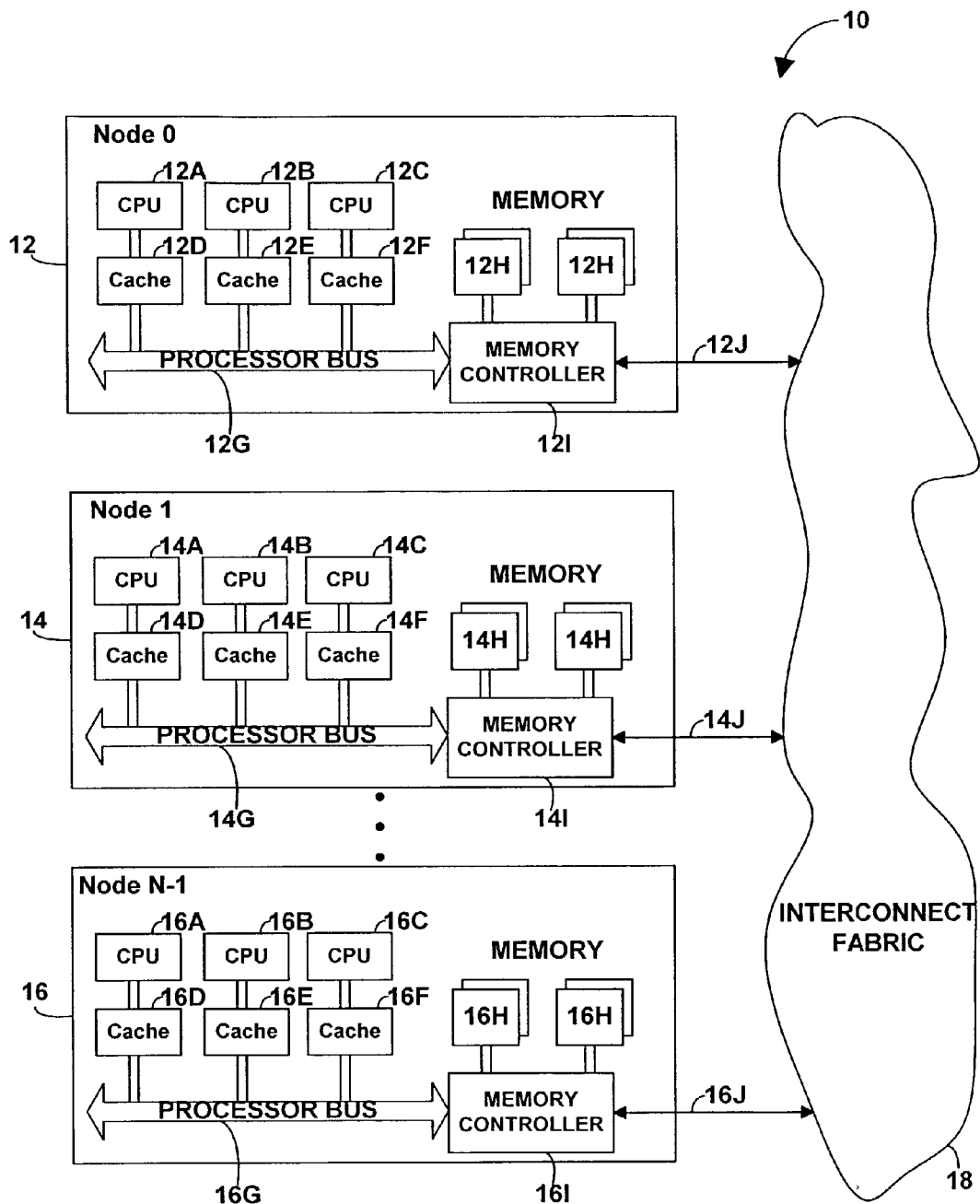
FIG. 1 illustrates an exemplary network computer system.

FIG. 1 illustrates an exemplary multi-node computer network, generally illustrated as system 10. As previously described, a computer system 10 may comprise a plurality of nodes 12, 14, 16, each connected via an interconnect fabric 18. The system 10 may include any desirable number of nodes and may also be referred to as "node 0," "node 1," and "node N-1" as illustrated. The interconnect fabric 18 is essentially a bus or switch which couples each of the nodes 12, 14, 16 together. The interconnect fabric 18 may comprise a bus, switch, crossbar, ring, mesh, or any other high speed cache coherent network topology, or combination as can be appreciated by those skilled in the art.

Each node, such as node 12, may include one or more processors such as CPUs 12A–12C. While the present embodiment illustrates three CPUs 12A–12C, the number of processors on a particular node may vary depending on the system. Each CPU 12A–12C includes an associated cache 12D–12F which may be used to store data and programs such as presently used data or frequently used programs. Each cache 12D–12F may be internal to the respective CPU 12A–12C or may be a separate chip provided for a corresponding CPU 12A–12C, as shown in FIG. 1. Each of the CPUs 12A–12C and corresponding caches 12D–12F are connected via a shared processor bus 12G. The shared processor bus 12G allows each of the CPUs 12A–12C (and corresponding caches 12D–12F) to exchange information. Further, the shared processor bus 12G connects the CPU 12A–12C to the node's main memory 12H through a memory controller 12I.

The main memory 12H may include a number of memory devices such as DRAMs or other commercially available memory devices. Further, memory devices may be arranged to form memory modules such as dual in-line memory modules (DIMMs), as can be appreciated by those skilled in art. The memory controller 12I controls the access to the main memory 12H. Thus, if a CPU 12A–12C initiates a request to main memory 12H, such as a read request or a write request, the memory controller 12I is responsible for establishing a proper protocol and prioritizing of the requests to the main memory 12H and facilitating the exchange of data to and from the main memory 12H. Further, the memory controller 12I provides access to the other nodes 14 and 16 through the interconnect fabric 18. A data link or bus between the memory controller 12I and the interconnect fabric 18, such as the interconnect bus 12J, may be provided to facilitate the networking of the node 12 with the other nodes 14 and 16 in the system 10.

Each of the nodes 14 and 16 may include an architecture that is substantially similar to that described with reference to node 12. For illustrative purposes, each of the components illustrated in nodes 14 and 16 are similar to the components illustrated and described with reference to node 12. Like reference numerals are used to correspond with like components, as previously described. However, it is not necessary for each of the nodes 12, 14, and 16 to have an identical configuration such as number of processors or memory size. What is important to the multi-node system 10 is the connection of the devices among the nodes 12, 14, and 16 and the communicative relationship and data passing ability among each of the nodes 12, 14, and 16 via the interconnect buses 12J, 14J, and 16J and the interconnect fabric 18.

For instance, the CPU 12A may request access to the main memory 14H. However, due to process migration, the data may still be in the cache memory 16E corresponding to the CPU 16B. Thus, in the presently illustrated distributed memory architecture, the main memory segments 12H, 14H, and 16H make up a portion of the total memory in the system 10. As a matter of convenience, the main memory segment 12H is said to be "local" with respect to each of the CPUs 12A–12C. Likewise, the main memory segment 14H is said to be local with respect to the CPUs 14A–14C, and so forth. Conversely, the main memory segment 14H is said to be "remote" with respect to the CPUs 12A–12C. Further, the memory segment 16H is farther remote to the CPUs 12A–12C than is the memory segment 14H. The remoteness with respect to a particular CPU is defined with respect to access time. That is to say that it generally takes longer for the CPU 12A to access the main memory segment 16H than it does for the CPU 12A to access the main memory segment 14H. Table 1 below illustrates an exemplary memory access latency time (nano seconds) for accessing nodes in an exemplary 8 node system.

TABLE 1

| Node ID | 7 | 6 | 5 | 4 | 3 | 2 | 1 | 0 |
|---|---|---|---|---|---|---|---|---|
| 0 | 400 | 400 | 500 | 500 | 400 | 400 | 300 | 200 |
| 1 | 400 | 400 | 500 | 500 | 400 | 400 | 200 | 300 |
| 2 | 500 | 500 | 400 | 400 | 300 | 200 | 400 | 400 |
| 3 | 500 | 500 | 400 | 400 | 200 | 300 | 400 | 400 |
| 4 | 400 | 400 | 300 | 200 | 400 | 400 | 500 | 500 |
| 5 | 400 | 400 | 200 | 300 | 400 | 400 | 500 | 500 |
| 6 | 300 | 200 | 400 | 400 | 500 | 500 | 400 | 400 |
| 7 | 200 | 300 | 400 | 400 | 500 | 500 | 400 | 400 |

In the exemplary table, eight nodes in a distributed memory computer system are illustrated. Table 1 illustrates the latency period for accessing memory from one node to another. As can be seen in Table 1, local access (e.g., from Node 0 to Node 0) generates the minimum latency. Generally, reducing latency from each access improves the overall performance of the system. As illustrated in the exemplary table, access from Node 0 to Node 0 (i.e. local access) has the minimum latency while access from Node 0 to Nodes 4 and 5 adds a substantially greater latency since these nodes are the farthest remote (in time) with respect to Node 0. A general description of the functionality of the present system and the implementation of system tables, such as Table 1, provided below. A more detailed illustration of exemplary embodiments follows the general description, as illustrated through FIGS. 2 and 3 and the corresponding text.

As can be seen from Table 1, to reduce latency and to optimize system performance, it would be advantageous for the memory used by an application to be local with respect to the CPU from which it is executing. Therefore, it would be desirable to allocate an application data set (i.e., memory allocated for the particular application) from the same node as the CPU hosting the application. By correlating physical memory allocations with requesting CPU locations, memory access latency can be reduced and overall system performance can be improved.

To implement this technique, a set of tables or data structures which correlates and groups CPUs and memory segments on the same node may be implemented. This physical memory address to CPU correlation is shown in Tables 2 and 3. The tables would be read in from a non-volatile memory during system initialization by code in the firmware of the system. The minimum memory access latency could be static for a given fabric 18. The tables or set of data structures could reside in one common non-volatile memory or identical copies could be present on each CPU cluster or memory node depending on the particular implementation. In one embodiment, one set of tables may describe the entire set of nodes connected to a system. The CPUs on a shared processor bus may be grouped as a cluster, as will be further described with reference to Table 2 below.

TABLE 2

| Memory Node ID | Bus ID | Physical CPU ID | Logical CPU ID |
|---|---|---|---|
| 0 | 0 | 0 | 0 |
|   |   |   | 1 |
|   |   | 1 | 2 |
|   |   |   | 3 |
|   | 1 | 2 | 4 |

TABLE 2-continued

| Memory Node ID | Bus ID | Physical CPU ID | Logical CPU ID |
|---|---|---|---|
|   |   |   | 5 |
|   |   | 3 | 6 |
|   |   |   | 7 |
| 2 |   | 4 | 8 |
|   |   |   | 9 |
|   |   | 5 | 10 |
|   |   |   | 11 |
| 3 |   | 6 | 12 |
|   |   |   | 13 |
|   |   | 7 | 14 |
|   |   |   | 15 |

The O/S will sue the same data structure to apply to a variety of different architecture configurations. For instance, a simple four ( ) processor system on a shared bus and single memory controller may be described as one Memory Node ID=0, one Bus ID=0 connected to Memory Node ID 0, and having four physical CPU IDs 0–3 connected to Bus ID 0. A system having multiple buses attached to one memory controller, such as the system described with reference to Table 2, may be described as follows: the Memory Node ID=0 includes two bus IDs 0 and 1 both connected to Memory Node ID=0, and having physical CPU IDs 0 and 1 connected to Bus ID 0 and physical CPU IDs 3 and 4 connected to Bus ID 1. Similarly, the system described with reference to Table 2 includes a second Memory Node ID=1, having two Bus Ids 2 and 3 both connected to the Memory Node ID=1 and having physical CPU IDs 4 and 5 connected to Bus ID 2 and physical CPU IDs 6 and 7 connected to Bus ID 3. As can be appreciated, the system described with reference to Table 2 illustrates one exemplary embodiment. Further, the actual coding of these table or data structures depends on the particular programming language, as can be appreciated by those skilled in the art. The real advantage of these data structures becomes apparent when describing multiple buses with one or more memory controllers as shown in the exemplary system described by Table 2.

If certain nodes are more remote in time with respect to others (i.e., as the node access would require a greater latency period), the table describing node proximity relative to other neighboring nodes in the system, such as Table 1, can be implemented to help determine the most advantageous memory allocation scheme. The physical memory address would be described by a third table or data structure. This data structure, as exemplified in Table 3, would provide the physical address ranges available on each memory node. The combination of the data structure exemplified by Tables 2 and 3 would provide the complete correlation among logical processors, physical CPUs, and buses to physical memory ranges on the memory nodes. Implementation of Tables 2 and 3 is described further below.

TABLE 3

| Memory Node ID | Node's Base Physical Address | Top of Physical Address at Node | Size |
|---|---|---|---|
| 0 | 0 x 00, 0000, 0000 | 0 x 01, FFFF, FFFF | 8 GB |
| 1 | 0 x 10, 0000, 0000 | 0 x 10, 7FFF, FFFF | 2 GB |
| 2 | 0 x 20, 0000, 0000 | 0 x 20, FFFF, FFFF | 4 GB |
| 3 | 0 x 30, 0000, 0000 | 0 x 30, 3FFF, FFFF | 1 GB |
| 4 | 0 x 40, 0000, 0000 | 0 x 40, FFFF, FFFF | 4 GB |

Once the set of tables has been established, the O/S can optimize performance of the process/thread scheduling algorithm and the memory management and allocation algorithm which are implemented in distributed memory computer architectures. When there are fewer active processes/threads than CPUs, finding an available CPU to run a newly created process/thread and allocating memory from a local memory node may not be a problem.

Most operating systems have soft affinity and hard affinity available in the scheduler algorithm. Typically, soft affinity algorithms attempt to keep a process or thread on the same CPU to benefit from the temporal locality of reference properties of the CPU's cache. With hard affinity, the O/S or user may fix certain threads to only run on a limited set of processors. In a multi-node system where a process/thread may be scheduled to run on any of the available CPUs, it would be advantageous to schedule the process/thread to run on the same bus, and ideally the same CPU, from which it previously ran. (Most process data structures retain the previous processor ID value.) By incorporating the reference tables in the "process/thread scheduler algorithm" and the memory management and allocation algorithm (or "page-fault handler algorithm"), system performance can be improved.

A further consideration is a concept which is rapidly gaining popularity in microprocessor design. Simultaneous multi-threading (SMT) essentially provides a single processor or CPU with multi-processor capability. SMT is a mechanism for dynamically allocating a CPU's internal processing elements or resources to multiple instruction streams to provide the most efficient use of resources when one stream is blocked for a variety of situations. SMT CPUs maintain multiple instruction pointers to dispatch instructions to processing elements from multiple instruction streams and allow concurrent program and application processing using multiple threads. One of the benefits of SMT is that is confers the performance benefits of a multi-processor system, without incurring the cost of multiple physical CPU elements.

With the implementation of SMT CPUs, where one physical CPU and associated cache may support two or more simultaneous instruction streams, it would be advantageous to consider the shared physical cache when migrating the processor to another logical CPU. One of the properties of multi-processor shared memory buses is that the cache-to-cache transfers on the same bus are faster than even a local memory access. For existing processes being rescheduled, assigning a thread back to the same physical CPU will have no additional distance (time) penalty associated with the transaction than it did when it was previously running. Further, assignment to a CPU on the same bus has only a small timing penalty compared to an assignment to a CPU on another bus. Thus, the affinity algorithm in the processor scheduler may advantageously implement the following order for hardest to softest process to CPU affinity:

1. Closest Memory Node (closest node in time using Table 1)
2. Same Memory Node (using CPU to memory node correlation, Table 2)
3. Same bus (using CPU to bus correlation, Table 2)
4. Same physical CPU (using logical to physical CPU correlation, Table 2)

If a process must migrate to another bus or node, it would be advantageous to migrate to a CPU bus or node as close in proximity as possible to the CPU bus or node where it was previously executing. Thus, the memory allocation algorithm uses the node proximity described with reference to Tables 1 and 2 to determine which CPU or node is closest and thereby minimize remote memory request latencies, whereas the scheduling algorithm would use both Tables 1 and 2 to reschedule a process thread to run on the closest CPU to which it was originally scheduled.

The affinity algorithm in the scheduler helps only if the memory allocated for the process can somehow be allocated near the CPU from which the request was generated. When the O/S receives a request to create a new process/thread, it first allocates memory space for the code and data from the available pages or old existing pages before it can schedule the process/thread to run. The memory manager examines the tables and coordinates with the scheduler to correlate the assignment of the initial CPU ID with the physical memory pages allocated for that process. During process creation, the kernel allocates memory for the new process and enters the information in the O/S process table. The process is put into a ready-to-run queue and assigned to a processor when one becomes available. In accordance with the present techniques, the kernel examines the physical memory address of the process, determines the memory node ID from Table 3 and looks for an available processor on the same node from Table 2. Slave, child, or worker threads would be assigned to CPUs with close proximity to its master or parent process to benefit from shared memory space. New applications can be allocated memory anywhere within the populated system's memory. The process is put in the ready-to-run queue as usual, as understood by those skilled in the art. A more detailed description of the functionally of the process scheduler will be described with reference to FIG. 2 below.

Before describing the process scheduler in more detail, the page fault handler and memory allocation are generally described. In a "demand paging system," pages are allocated as they are needed. "Paging" is a technique used by virtual memory operating systems to help ensure that requested data is available only when needed. The O/S copies a certain number of pages from a storage device to main memory. When a program requests a page that is not in main memory, the O/S copies the required page into memory from a disk cache, disk, or network drive. Each time a page is needed that is not currently in memory, a "page fault" occurs. The page fault invokes an interrupt routine to fetch the data from a storage device and load it into the RAM memory.

In a demand paging system, pages are allocated based on program requirements. In accordance with the present techniques, as page faults occur and pages are fetched from disk to memory, the memory manager will favor page locations on the same node as the faulting CPU (requesting the pages). Programs may also request dynamic allocation of memory for permanent or temporary use or manage a dynamic link library of functions. The same algorithm is implemented whenever a process/thread requests memory.

Memory managers typically maintain a list of free pages. As can be appreciated by those skilled in the art, the memory manager generally uses an algorithm such as a "least recently used" or "LRU" algorithm and modification information to determine which virtual pages are replaced. LRU algorithms generally replace the oldest unmodified pages first following by the oldest modified pages. Unmodified pages do not need to be written back to disk since they are identical to the disk contents. Modified pages will need to be written back to disk. LRU algorithms typically replace pages with little or no attention to the physical address. As previously discussed, allocating memory which is remote to a processing CPU increases latency and decreases system performance. As presently described, the memory manager in the O/S maintains a list of pages spread across multiple nodes in the O/S domain and assigns pages closest to the faulting CPU. When the list of free pages gets low, the memory manager can implement the LRU replacement algorithm. A more detailed description of the page fault handler and memory allocation is provided below with reference to FIG. 3.

Before describing the more specific exemplary embodiments of the process scheduler and page fault handler and the tables implemented through each algorithm, it should be understood that the presently described algorithms may also be implemented with disk cache as well. As previously described, some operating systems may pre-fetch and retain data from disk or keep disk data in a temporary disk cache rather than in the CPU or memory. In Windows NT, for example, the majority of non-allocated memory is used for disk caching. In some UNIX variants, the administrator pre-allocates a specified amount of physical memory for disk cache, and the amount may fluctuate between a high and low water mark. The system performance will also benefit from a memory management algorithm when pre-fetching and retaining pages allocated for disk cache. Further, while the present techniques are described with reference to multi-node cc-NUMA computer architectures, the present technique may be applied to almost any multi-tasking O/S running on a cache coherent multi-processor computer system.

During system initialization, and before the O/S is fully loaded, a section of code within the firmware's hardware abstraction layer (HAL), software abstraction layer (SAL), or BIOS detects and tabulates the configuration of the CPUs and memory for all of the nodes in the system. The tables are created and maintained by some supervisory level system management software. For support of hot add and hot replace components, Tables 2 and 3 will be updated as the system configuration changes.

As previously described with reference to Table 1, an exemplary memory node access latency table is described. The values in Table 1 indicate the minimum memory access time from a CPU on one processor bus to any of the main memory segments in the system. The computer manufacturer would calculate for a fully configured/populated system and store these values in non-volatile memory somewhere in the computer system 10 such as the EEPROM on each node 12, 14, 16 or interconnect fabric 18. The remote node memory access penalty table (Table 1) may remain static for the life of the system.

Table 2 illustrates an exemplary SMT logical processor ID to memory node mapping. This table contains a mapping of the number of logical processors sharing a cache within a single physical CPU, CPUs sharing the same bus, and buses sharing the same memory controller. Each physical processor ID has one or more logical processor IDs to implement the simultaneous multi-threading. This may be an SMT processor which shares ALU processing elements and cache, but maintains separate register, status, and instruction pointer sets, or it may be multiple CPU cores which share a common cache.

Table 2 also illustrates an exemplary physical CPU mapping to bus or node ID. For a multi-bus or multi-node system, such as system 10, this table includes a mapping of the number of physical CPUs from Table 2 that share the same CPU processor bus. In an exemplary system 10, CPUs 12A–12C share a common processor bus 12G, for example. Table 2 groups or clusters a set of physical CPUs whose cache-to-cache access and data transfer times between caches are equal and at a minimum compared to CPUs on other buses in the system (i.e., less remote). Typically this would include physical CPUs on the same shared processor bus or on the same processor interface controller which snoops to the other local CPU caches as previously described.

With the general description and exemplary tables disclosed above, specific techniques for implementing the process scheduler and the page fault handler will now be described with reference to FIGS. 2 and 3, as well as Tables 1–3. When an operating system is initialized (or "booted"), Tables 1–3 will be read such that the operating system can determine the number of CPUs, their grouping, and the physical mapping to buses and memory nodes. The O/S typically boots from one CPU and places the remaining CPUs in an idle wait loop until the boot operation reaches a predetermined level of stability. Once the O/S is at a point where it can schedule processes and threads to run on the idle CPUs in its domain, the process scheduler and page fault handler may be implemented. To reap the benefits of the presently described latency reduction techniques, certain changes are made in the existing operating system such that it is able to incorporate and use Tables 1–3. Generally, the present techniques can be implemented by augmenting the process/thread scheduling algorithm as well as the memory management algorithm, as described below. These general algorithms should exist in most multi-tasking, multi-processor operating systems.

Figure 2:
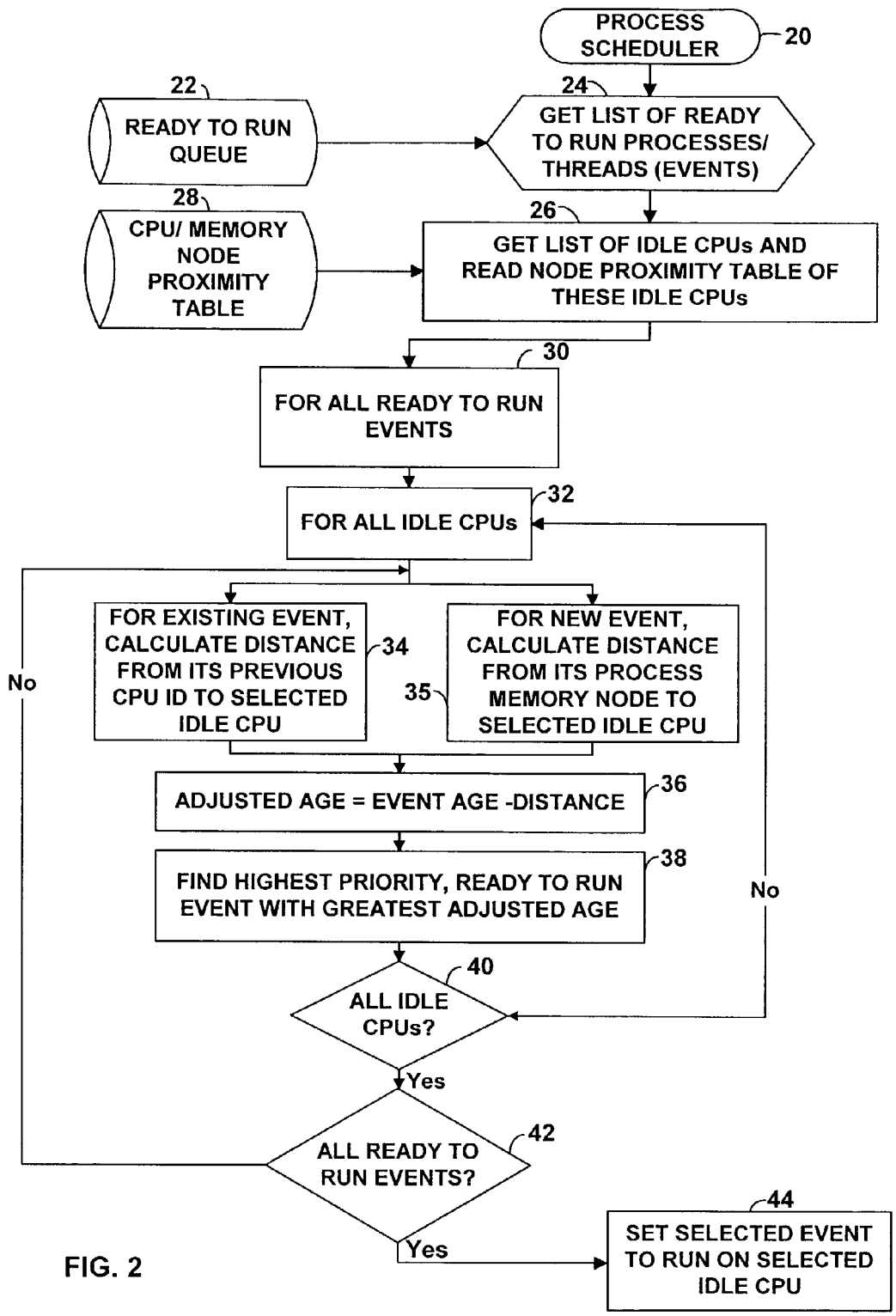
FIG. 2 is a flow chart illustrating a scheduling technique in accordance with the present invention.
Figure 3:
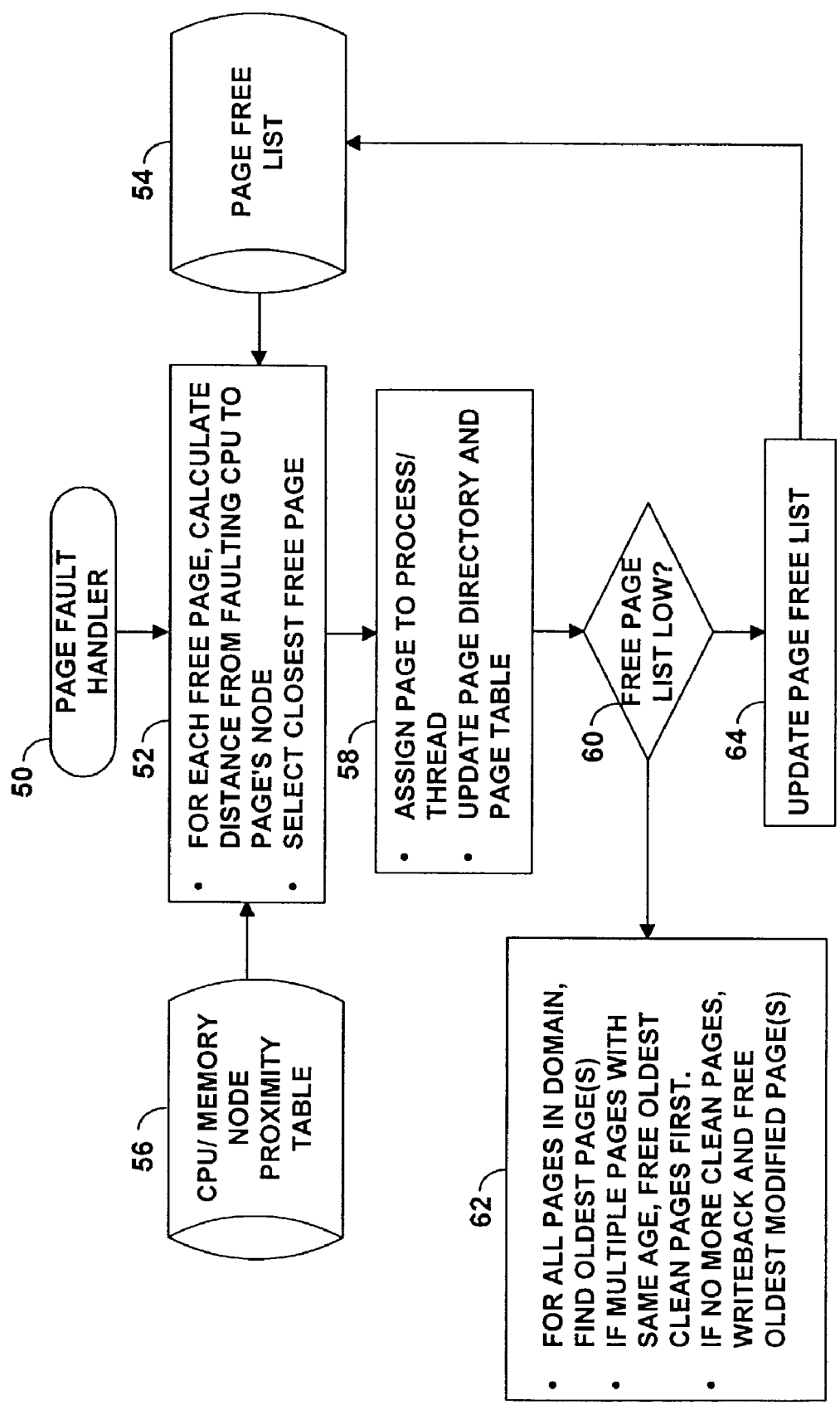
FIG. 3 is a flow chart illustrating a memory management technique in accordance with the present invention.

FIG. 2 is a flow chart illustrating an enhancement of the typical scheduling process. Instead of scheduling the next ready-to-run process on any idle CPU based solely on request priority or age, the process scheduler will use the information provided in Tables 1–3 and choose a process/thread to run on the closest available idle CPU. Running the next process thread on a CPU with the same physical ID (i.e., any one of the logical processors sharing the same physical CPU) will not have any distance penalty (i.e., added latency) if it is run on the same cache as the previous process/thread. CPUs on the same bus-(cluster) but not having the same physical CPU ID will have a small distance penalty. The largest latency penalty is created when a process/thread is scheduled to run on a CPU located on another bus (cluster) or node, as previously discussed. A minimum age limit may be imposed, in some cases, to prevent a ready-to-run process from getting scheduled on a node which is too far remote and will add a considerable latency penalty. In other words, proximity is also considered by the process scheduler. In a lightly loaded system, this may result in some CPUs experiencing idle time until an existing process with a closer previous CPU ID value or new process is able to run on it with a closer previous CPU ID value. As the ready-to-run process age increases, it is less likely that the data would still be available in the physical CPU's cache or any other cache in the cluster. The process should still be scheduled on a CPU close to where the existing active pages for that process are located.

In a typical scheduler, processes and threads sitting in the ready-to-run queue have an age value which is incremented on every system clock (tick) cycle. The scheduler would normally pick the highest priority process/thread with the oldest age to run on the next available CPU. The present process scheduler improves the typical scheduling algorithm by subtracting some distance value from the age making the process age on a remote CPU ID appear younger and thus less likely to be chosen. By incorporating this technique, memory access latency can be minimized and overall processor performance can be optimized. Some distance multiplier constant may be used to adjust the penalty value obtained in Table 1 to something on the same magnitude at the process age value. The size of the distance multiplier constant adjusts a relative strength of the process/thread affinity to its previous physical CPU, cluster, or node ID. For busy systems, the interconnect can become congested, increasing the memory access latency. A congestion factor would be added to the base values in Table I to provide a more realistic latency value.

The aforementioned process is illustrated in FIG. 2. The process scheduler is typically invoked when a new process/thread is created, an existing thread must be rescheduled because it put itself to sleep waiting on some I/O, or it has used up its multi-tasking time slice. In either case, the process scheduler 20 obtains a list of the ready to run processes/threads from the ready-to-run queue 22, as indicated in block 24. These events (i.e. the processes or threads) may be new events or rescheduled events. Next, as illustrated by reference numeral 26, the process/scheduler 20 obtains a list of idle CPUs and reads the node proximately table 28 of these idle CPUs. Next, the process scheduler implements embedded loops to run the processes/threads for all idle CPUs. Thus, for all ready-to-run processes/threads, as indicated by block 30, and for all of the idle CPUs, as indicated by block 32, an "adjusted age" is calculated for all possible permutations. For all previously run process/threads, the distance from its previous CPU ID to a selected idle CPU is calculated, as indicated in block 34. A new application process would be scheduled to run on any of the processors associated with the memory node from which its process pages were allocated, as indicated in block 35. A new child process/thread would use the CPU ID of its parent as the previous processor. The process age (i.e., the age value associated with the time the process has been waiting in the ready-to-run queue) is adjusted by subtracting the calculated distance between the process thread's previous CPU ID (new event) or corresponding memory node (child event) and the selected idle CPU ID (i.e., the static latency penalty obtained from Table 1). Thus, the adjusted age equals the process age minus the distance, as indicated in block 36. This would narrow the selection of processors to a particular memory node. Next, a process scheduler 20 finds the highest priority ready-to-run process with the greatest adjusted age and initiates that process, as indicated in block 38. This process is repeated for all idle CPUs, as indicated in block 40, and for all ready-to-run processes/threads, as indicated in block 42. Finally, the selected process (i.e., the highest priority ready-to-run process with the greatest adjusted age) is started or restarted on the selected idle CPU, as indicated in block 44. By implementing the proximity tables (Tables 2 and 3) and the penalty table (Table 1) in the scheduling of processes, overall system performance may be advantageously improved.

The memory management and allocation techniques are generally illustrated with reference to FIG. 3. The memory manager normally maintains a free list of pages that are readily available for applications to allocate. The enhanced page fault handler described herein differs from previous free page selection techniques by referencing the node proximity tables (Table 1–3) to calculate the distance from the free page to the faulting CPU. By choosing a physical page near the requesting/faulting CPU cluster or node, the memory access time will be considerably less than if a remote page had been allocated.

When a process or application starts, the page fault handler, as indicated in block 50, will allocate memory to be used for the application. Generally, for each free page, the distance from the faulting CPU to the page's node is calculated and the closest free page is selected for use, as illustrated by block 52. The page fault handler 50 consults the free page list 54 and the CPU/memory node proximity Tables 1–3, as shown by block 56, to calculate and select the closest free page available. Next, the selected page is assigned to the process space to be used for the application or process being implemented by the page fault handler 50 and the page directory and page table are updated as shown in block 58. In each cycle iteration, the page fault handler 50 monitors the free page list 54. If the free page list 54 reaches a low mark, the pages are cleaned such that they may be used again. The low mark check is generally illustrated by decision block 60. If the free page list does reach a minimum threshold, the oldest pages are found by the page fault handler 50. If multiple pages with the same age are found, the oldest clean pages are freed first. If the free page list 54 is still at or below the low mark and no more clean pages are detected, the oldest modified pages are written back to disk and freed, as indicated in block 62. Regardless of whether the page fault handler 50 determines that the page list was low or if pages are necessarily freed, the page free list 54 is updated, as indicated in block 64.

In this scheme, it is possible that at some point, all of the memory at one or more nodes may be allocated or used. If a local application continues to demand more pages than are available from the free list on the local memory node, the memory may be obtained from the next nearest node (i.e., the node with the lowest latency penalty with respect to the node executing the process, as determined by Table 1). Although an application's "Execute Function" (or "Process Creation Function") which initiates the running of the process, could specify affinity to the calling/parent process, it would still be advantageous to default for unspecified process creation. When a process/thread is created, an affinity mask may be used to limit the number of processors to which the process/thread may be assigned. In accordance with the present techniques, an affinity mask used by a fork function (UNIX) or Create Thread function (Microsoft) could specify the relative distance from its parent rather than simply assigning an absolute CPU ID regardless of distance penalty.

The processes described with reference to FIGS. 2 and 3 above comprise an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). It is even possible to use paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of scheduling the execution of events in a system, comprising the acts of:
    obtaining a list of ready-to-run events;
    obtaining a list of idle processors in the system;
    determining a respective distance penalty associated with executing each of the ready-to-run events on each of the idle processors;
    calculating an adjusted age by subtracting the distance penalty from an age of the ready-to-run event for each of the ready-to-run events;
    scheduling each of the ready-to-run events to execute on one of the idle processors in an order starting with the highest priority ready-to-run event having the greatest adjusted age.

2. The method of scheduling the execution of events in a system, as set forth in claim 1, wherein the act of determining comprises the act of reading one or more proximity tables, wherein each of the one or more proximity tables corresponds to one of a processor to memory map and a static memory latency penalty.

3. The method of scheduling the execution of events in a system, as set forth in claim 1, wherein the act of determining comprises the act of for a rescheduled event, determining the distance penalty associated with a processor on which the rescheduled event was previously executed and each of the idle processors.

4. The method of scheduling the execution of events in a system, as set forth in claim 1, wherein the act of determining comprises the act of for a new event, determining the distance penalty associated with a memory segment allocated for the new event and each of the idle processors.

5. The method of scheduling the execution of events in a system, as set forth in claim 1, wherein the act of calculating an adjusted age comprises the act of subtracting a distance penalty multiplier from an event age for each of the ready-to-run events, wherein the distance penalty multiplier comprises a scaled value that is directly proportional to the distance penalty, and where the event age comprises a value that is relative to a number of clock cycles that the corresponding ready-to-run event has been waiting to execute.

6. A method of managing a system comprising the acts of:
    initiating a request for memory pages from a process/thread executing on a processor;
    receiving a page fault at the processor;
    obtaining a list of free memory pages from a free page list, wherein each of the free memory pages corresponds to a memory node;
    reading a penalty table and one or more proximity tables, wherein the penalty table provides a latency time for accessing each of the memory nodes from the processor, and wherein the proximity tables provide a map of the system associating the processor proximity to each of the memory nodes by providing physical and logical identification of the processor, physical and logical identification of each of the memory nodes, and bus identification between each of the memory nodes and the processor;
    based on the readings of the penalty table and the proximity tables, calculating a corresponding distance penalty from each of the memory nodes corresponding to each of the free memory pages to the processor; and
    selecting the memory page with the smallest corresponding distance penalty from the list of free memory pages.

7. The method of managing a system, as set forth in claim 6, comprising the act of building the one or more proximity tables and the penalty table during initialization of the system.

8. The method of managing a memory system, as set forth in claim 6, comprising the act of updating the one or more proximity tables and the penalty table if additional nodes are added to the system.

9. The method of managing a system, as set forth in claim 6, comprising the acts of:
    assigning the selected free memory page to the process/thread; and
    updating a page directory corresponding to the allocation of each page in the system.

10. A computer readable medium for storing a computer program comprising instructions for at least one of assigning processors to execute tasks, scheduling tasks, and assigning free memory pages, wherein the instructions access a penalty table and at least one table comprising proximity information with reference to at least one of a processor, a node or available memory, and wherein the at least one proximity table provides a map associating the processors with each of the nodes by providing physical and logical identification of the processors, physical and logical identification of each of the nodes, and bus identification between each of the nodes and each of the processors, and wherein the penalty table provides a latency time for accessing each of the nodes from the each of the processors, and wherein the instructions schedule the processors to execute the tasks based at least partially on the proximity information and the latency time.

11. The computer readable medium, as set forth in claim 10, wherein the computer readable medium comprises:
    instructions for obtaining a list of ready-to-run events;
    instructions for obtaining a list of idle processors in the system;
    instructions for determining a respective distance penalty associated with executing each of the ready-to-run events on each of the idle processors; and
    instructions for scheduling each of the ready-to-run events to execute on one of the idle processors, wherein the selection is based at least partially on the respective distance penalty.

12. The computer readable medium, as set forth in claim 11, wherein the instructions for determining comprise instructions for reading one or more proximity tables, wherein each of the one or more proximity tables corresponds to one of a processor to memory map and a static memory latency penalty.

13. The computer readable medium, as set forth in claim 11, wherein the instructions for determining comprise for a new event, instructions for determining the distance penalty associated with a memory segment allocated for the new event and each of the idle processors.

14. The computer readable medium, as set forth in claim 11, wherein the instructions for scheduling comprise:
    instructions for calculating an adjusted age for each of the ready-to-run events; and
    instructions for scheduling each of the ready-to-run events to execute on one of the idle processors in an order starting with the highest priority ready-to-run event having the greatest adjusted age.

15. The computer readable medium, as set forth in claim 14, wherein the instructions for calculating comprise instructions for subtracting a distance penalty multiplier from an event age for each of the ready-to-run events, wherein the distance penalty multiplier comprises a scaled value that is directly proportional to the distance penalty, and where the event age comprises a value that is relative to a number of clock cycles that the corresponding ready-to-run event has been waiting to execute.

16. The computer readable medium, as set forth in claim 10, wherein the computer readable medium comprises:

instructions for initiating a request for memory pages from a process/thread executing on a processor;

instructions for receiving a page fault at the processor;

instructions for obtaining a list of free memory pages from a free page list, wherein each of the free memory pages corresponds to a memory node;

instructions for calculating a corresponding distance penalty from each of the memory nodes corresponding to each of the free memory pages to the processor; and instructions for selecting the memory page with the smallest corresponding distance penalty from the list of free memory pages.

17. The computer readable medium, as set forth in claim 16, wherein the instructions for calculating comprise instructions for reading a proximity table to obtain the corresponding distance penalty from each of the free memory pages to the processor.

18. The computer readable medium, as set forth in claim 16, comprising:

instructions for assigning the selected free memory page to the process/thread; and instructions for updating a page directory corresponding to the allocation of each page in the system.

* * * * *

UNITED STATES PATENT AND TRADEMARK OFFICE
CERTIFICATE OF CORRECTION

PATENT NO.        : 7,143,412 B2
APPLICATION NO.   : 10/202788
DATED             : November 28, 2006
INVENTOR(S)       : David J. Koenen Page 1 of 1

It is certified that error appears in the above-identified patent and that said Letters Patent is hereby corrected as shown below:

In column 5, line 28, after "Table 1," insert -- is --.

In column 6, line 16, delete "sue" and insert -- use --, therefor.

Signed and Sealed this

Thirty-first Day of March, 2009

JOHN DOLL
*Acting Director of the United States Patent and Trademark Office*